United States Patent
Stange et al.

(10) Patent No.: US 7,765,427 B2
(45) Date of Patent: Jul. 27, 2010

(54) MONITORING SYSTEM AND METHODS FOR A DISTRIBUTED AND RECOVERABLE DIGITAL CONTROL SYSTEM

(75) Inventors: Kent Stange, Phoenix, AZ (US);
Richard Hess, Glendale, AZ (US);
Gerald B Kelley, Glendale, AZ (US);
Randy Rogers, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 999 days.

(21) Appl. No.: 11/381,637

(22) Filed: May 4, 2006

(65) Prior Publication Data

US 2007/0033195 A1    Feb. 8, 2007

Related U.S. Application Data

(60) Provisional application No. 60/705,843, filed on Aug. 5, 2005.

(51) Int. Cl.
G06F 11/00 (2006.01)
(52) U.S. Cl. ........................................ 714/10
(58) Field of Classification Search .................... 714/10
See application file for complete search history.

(56) References Cited

U.S. PATENT DOCUMENTS

| | | |
|---|---|---|
| 4,345,327 A | 8/1982 | Thuy |
| 4,453,215 A | 6/1984 | Reid |
| 4,751,670 A | 6/1988 | Hess |
| 4,996,687 A | 2/1991 | Hess et al. |
| 5,086,429 A | 2/1992 | Gray et al. |
| 5,313,625 A | 5/1994 | Hess et al. |
| 5,550,736 A | 8/1996 | Hay et al. |

(Continued)

FOREIGN PATENT DOCUMENTS

EP    0363863    4/1990

(Continued)

OTHER PUBLICATIONS

Lee, "Design and Evaluation of a Fault-Tolerant Multiprocessor Using Hardware Recovery Blocks", Aug. 1982, pp. 1-19, Publisher: University of Michigan Computing Research Laboratory, Published in: Ann Arbor, MI.

(Continued)

Primary Examiner—Scott T Baderman
Assistant Examiner—Jigar Patel
(74) Attorney, Agent, or Firm—Fogg & Powers LLC

(57) ABSTRACT

A monitoring system and methods are provided for a distributed and recoverable digital control system. The monitoring system generally comprises two independent monitoring planes within the control system. The first monitoring plane is internal to the computing units in the control system, and the second monitoring plane is external to the computing units. The internal first monitoring plane includes two in-line monitors. The first internal monitor is a self-checking, lock-step-processing monitor with integrated rapid recovery capability. The second internal monitor includes one or more reasonableness monitors, which compare actual effector position with commanded effector position. The external second monitor plane includes two monitors. The first external monitor includes a pre-recovery computing monitor, and the second external monitor includes a post recovery computing monitor. Various methods for implementing the monitoring functions are also disclosed.

18 Claims, 7 Drawing Sheets

U.S. PATENT DOCUMENTS

| | | | |
|---|---|---|---|
| 5,732,074 A | 3/1998 | Spaur et al. | |
| 5,757,641 A | 5/1998 | Minto | |
| 5,903,717 A | 5/1999 | Wardrop | |
| 5,909,541 A | 6/1999 | Sampson et al. | |
| 5,915,082 A * | 6/1999 | Marshall et al. | 714/11 |
| 5,949,685 A * | 9/1999 | Greenwood et al. | 700/193 |
| 6,058,491 A | 5/2000 | Bossen et al. | |
| 6,065,135 A | 5/2000 | Marshall et al. | |
| 6,115,829 A | 9/2000 | Slegel et al. | |
| 6,134,673 A | 10/2000 | Chrabaszcz | |
| 6,141,770 A | 10/2000 | Fuchs et al. | |
| 6,163,480 A | 12/2000 | Hess et al. | |
| 6,185,695 B1 | 2/2001 | Murphy et al. | |
| 6,189,112 B1 | 2/2001 | Slegel et al. | |
| 6,279,119 B1 | 8/2001 | Bissett et al. | |
| 6,367,031 B1 | 4/2002 | Yount | |
| 6,393,582 B1 | 5/2002 | Klecka et al. | |
| 6,467,003 B1 | 10/2002 | Doerenberg et al. | |
| 6,560,617 B1 | 5/2003 | Winger et al. | |
| 6,574,748 B1 | 6/2003 | Andress et al. | |
| 6,600,963 B1 | 7/2003 | Loise et al. | |
| 6,625,749 B1 | 9/2003 | Quach | |
| 6,751,749 B2 | 6/2004 | Hofstee et al. | |
| 6,772,368 B2 | 8/2004 | Dhong et al. | |
| 6,789,214 B1 | 9/2004 | De Monis-Hamelin et al. | |
| 6,813,527 B2 | 11/2004 | Hess | |
| 6,990,320 B2 | 1/2006 | LeCren | |
| 7,003,688 B1 | 2/2006 | Pittelkow et al. | |
| 7,062,676 B2 | 6/2006 | Shinohara et al. | |
| 7,065,672 B2 | 6/2006 | Long et al. | |
| 7,178,050 B2 | 2/2007 | Fung et al. | |
| 7,320,088 B1 | 1/2008 | Gawali | |
| 7,334,154 B2 | 2/2008 | Lorch et al. | |
| 7,401,254 B2 | 7/2008 | Davies | |
| 2002/0099753 A1 | 7/2002 | Hardin et al. | |
| 2002/0144177 A1 | 10/2002 | Kondo et al. | |
| 2003/0126498 A1 | 7/2003 | Bigbee et al. | |
| 2003/0177411 A1 | 9/2003 | Dinker et al. | |
| 2003/0208704 A1 | 11/2003 | Bartels et al. | |
| 2004/0019771 A1 | 1/2004 | Quach | |
| 2004/0098140 A1 * | 5/2004 | Hess | 700/3 |
| 2004/0221193 A1 | 11/2004 | Armstrong et al. | |
| 2005/0022048 A1 | 1/2005 | Crouch | |
| 2005/0138485 A1 | 6/2005 | Osecky et al. | |
| 2005/0138517 A1 | 6/2005 | Monitzer | |
| 2006/0041776 A1 | 2/2006 | Agrawal et al. | |
| 2006/0085669 A1 | 4/2006 | Rostron et al. | |
| 2008/0016386 A1 | 1/2008 | Dror et al. | |

FOREIGN PATENT DOCUMENTS

| | | |
|---|---|---|
| EP | 0754990 | 1/1997 |
| EP | 1014237 A1 | 6/2000 |

OTHER PUBLICATIONS

Racine, "Design of a Fault-Tolerant Parallel Processor", 2002, pp. 13.D.2-1-13.D.2-10, Publisher: IEEE, Published in: US.

Dolezal, "Resource Sharing in a Complex Fault-Tolerant System", 1988, pp. 129-136, Publisher: IEEE.

Ku, "Systematic Design of Fault-Tolerant Multiprocessors With Shared Buses", "IEEE Transactions on Computers", Apr. 1997, pp. 439-455, vol. 46, No. 4, Publisher: IEEE.

* cited by examiner

MONITORING SYSTEM AND METHODS FOR A DISTRIBUTED AND RECOVERABLE DIGITAL CONTROL SYSTEM

This application claims the benefit of priority to U.S. Provisional Application No. 60/705,843, filed on Aug. 5, 2005, which is incorporated herein by reference. The present application is related to U.S. patent application Ser. No. 11/381,608, filed May 4, 2006, and to U.S. patent application Ser. No. 11/381,652, filed May 4, 2006, both of which are incorporated herein by reference.

The U.S. Government may have certain rights in the present invention as provided for by the terms of Contract No. CRA NCC-1-393 with NASA.

BACKGROUND TECHNOLOGY

Computers have been used in digital control systems in a variety of applications, such as in industrial, aerospace, medical, scientific research, and other fields. In such control systems, it is important to maintain the integrity of the data produced by a computer. In conventional control systems, a computing unit for a plant is typically designed such that the resulting closed loop system exhibits stability, low-frequency command tracking, low-frequency disturbance rejection, and high-frequency noise attenuation. The "plant" can be any object, process, or other parameter capable of being controlled, such as an aircraft, spacecraft, medical equipment, electrical power generation, industrial automation, valve, boiler, actuator, or other device. A control effector is used to provoke a response by the plant. For example, when the plant is an aircraft, control effectors may be in the form of flight control surfaces such as rudders, ailerons, and/or elevators.

Various types of failures or faults may be encountered by conventional computing units found in control systems. A "hard fault" is a fault condition typically caused by a permanent failure of the analog or digital circuitry. For digital circuitry, a "soft fault" is typically caused by transient phenomena that may affect some digital circuit computing elements resulting in computation disruption, but does not permanently damage or alter the subsequent operation of the circuitry.

Soft faults may be caused by electromagnetic fields created by high-frequency signals propagating through the computing system. Soft faults may also result from spurious intense electromagnetic signals, such as those caused by lightning that induce electrical transients on system lines and data buses which propagate to internal digital circuitry setting latches into erroneous states. In addition to lightning, other elements of the electromagnetic environment (EME) such as high-intensity radiated fields (HIRF), radio communications, radar pulses, and the intense fields associated with electromagnetic pulses (EMP) may also cause soft faults. Further, high-energy atomic particles from a variety of sources (e.g., atmospheric neutrons, cosmic radiation, weapon detonation, etc.) may deposit sufficient energy in the bulk semiconductor material of a digital device to set electronic circuits into erroneous states. With the advent of smaller integrated circuits running at high speeds, soft faults are becoming more common such as in the radiation environment encountered by aircraft traveling at high altitudes. In such an environment, computing circuits containing state-of-the-art digital devices may be more susceptible to failure.

In conventional control systems, various forms of redundancy have been used in an attempt to reduce the effects of faults in critical systems. Multiple processing units, for example, may be used within a computing system. In a system with three processing units, for example, if one processor is determined to be experiencing a fault, that processor may be isolated and/or shut down. The fault may be corrected by correct data (such as the current values of various control state variables) being transmitted (or "transfused") from the remaining processors to the isolated unit. If the faults in the isolated unit are corrected, the processing unit may be re-introduced to the computing system along with the other two processing units.

Dissimilar computational redundancy is used to prevent the introduction of generic faults in control system architectures. Generic faults refer to common errors in system redundancies. Such errors can occur in the design and development of the hardware and software elements within general purpose computers that are used in control system architectures. As such, dissimilar computational redundancy would entail each redundant hardware element using a dissimilar microprocessor and each redundant microprocessor executing software (e.g., operating system, application, etc.) that was developed using a different programming language.

Other methods that have been used to help ensure the continued operation of control systems include the use of dissimilar technology, distributed computation redundancy, equalization, and mid-value voting. Each of these methods, however, generally requires at least one processing unit to remain operational at all times to preserve state variables. While the control systems may remain operational if all but one of the processing units experience a soft fault and the correctly-operating unit can be identified, the control system will not operate properly if all of the processors simultaneously experience soft faults. Similarly, if a lone properly-operating unit cannot be identified within the system, the system will not recover, as there would be no identifiable operating unit with correct values for all of the state variables to be transfused to the remaining units. In addition, because of the transfusion of state variables from other processing units, the system recovery may be relatively slow. It may therefore take an extended period of time for all processing units within the system to resume normal operation. In the meantime, redundant control is undesirably lost or degraded.

In the aerospace field, digital flight control systems are frequently interposed between the pilot and the flight control surfaces of an aircraft. Such systems may include fly-by-wire, auto-pilot, and auto-land systems. In a fly-by-wire system, in lieu of pilot controls being mechanically coupled (e.g., via cables or hydraulics) to the various primary flight control surfaces of the aircraft (such as the ailerons, elevators, and rudder), the position and movements of a pilot's controls are electronically read by sensors and transmitted to a computing system. The computing system typically sends electronic control signals to actuators of various types that are coupled to the primary flight control surfaces of the aircraft. The actuators are typically configured to move one or more control surfaces according to inputs provided by the pilot, or in response to feedback measured by a sensor on the aircraft. Failure of the control system could thus have catastrophic effects on the aircraft. Similarly, industrial, medical, or other systems may be gravely affected by certain control system failures.

In conventional flight control system (FCS) architectures, recovery from soft faults of FCS architectural elements, particularly in the flight control computer, is either not possible, has to resort to recovery attempts after a grace period of time, or requires recycling of power such as rebooting the computer. Any of these circumstances can impact the mean time between unscheduled removals (MTBUR) negatively. In addition, tight tolerance monitoring has been dependant on synchronous operations for tight tracking of redundant elements, and has been relatively federated and not easily scaleable.

High integrity digital flight control systems usually require incorporation of redundant elements to achieve required reliability. Management of systems to provide maximum theoretically possible availability of the redundant elements in the presence of soft faults is difficult to achieve without requiring close synchronization of the computing elements or other technically difficult monitoring mechanisms.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity aid detail through the use of the accompanying drawings, in which.

DETAILED DESCRIPTION

Figure 1:
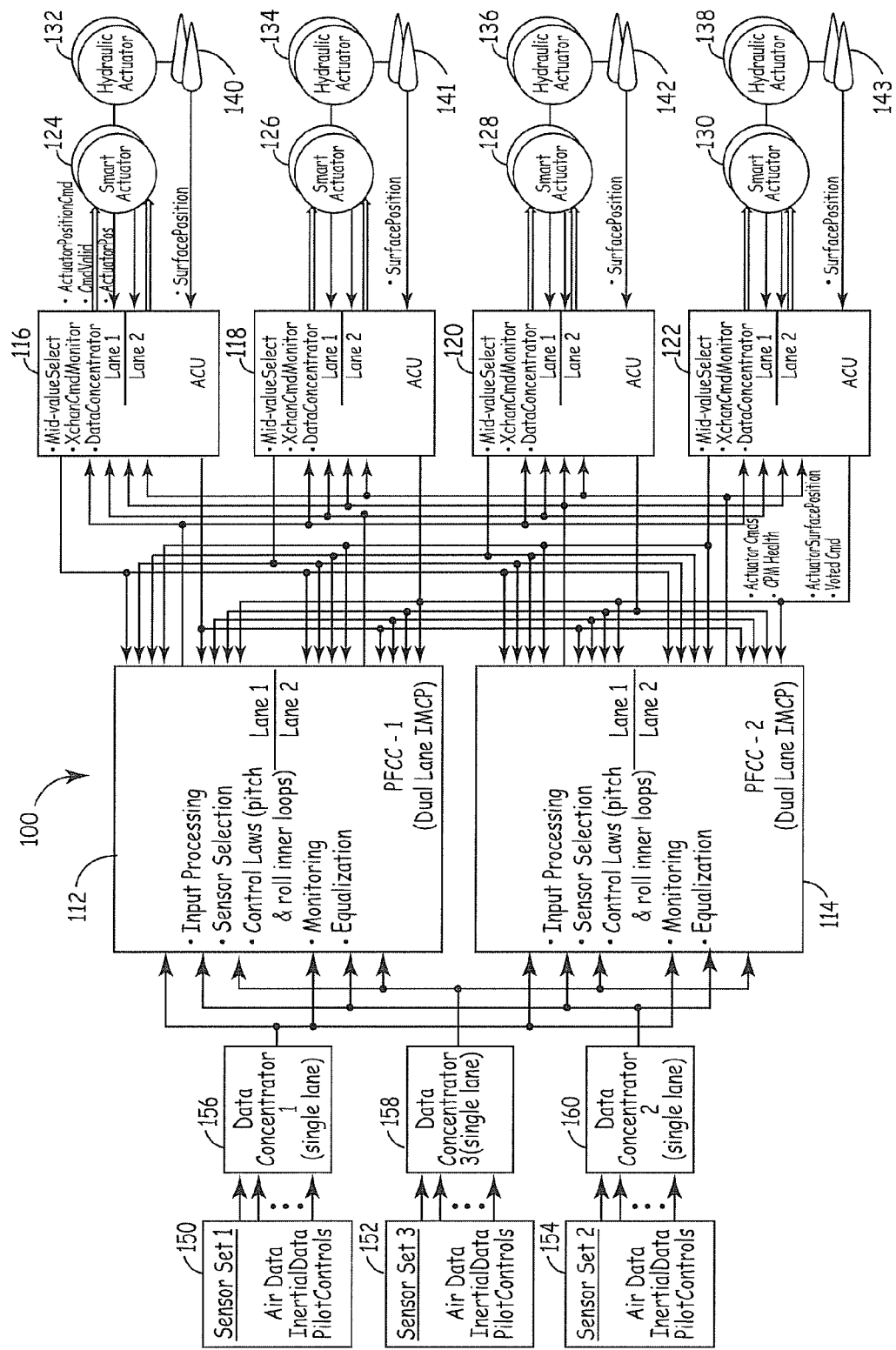
FIG. 1 is a schematic depiction of a digital control system that can employ the monitoring features of the invention according to one embodiment.

The present invention relates to a monitoring system and methods for a distributed and recoverable digital control system. The monitoring system generally comprises two independent monitoring planes within the control system. The first monitoring plane is internal to the computing units in the control system. The second monitoring plane is external to the computing units in the control system.

The internal first monitoring plane includes two in-line monitors. The first monitor is a self-checking, lock-step-processing monitor with integrated rapid recovery capability. The second monitor includes one or more reasonableness monitors, which compare actual effector position with commanded effector position.

The external second monitoring plane includes two monitors. The first monitor includes a pre-recovery computing monitor, and the second monitor includes a post recovery computing monitor. Once the computational elements have been deemed to be computing errant outputs, a rapid recovery is triggered. The monitoring of that errant computational element then follows a post recovery algorithm to determine if the recovery was successful. If the recovery was successful the outputs of the recovered element are re-enabled to be blended with the remaining system outputs in computing the blended system output. If the recovery was not successful the recovered computational element is eliminated from the output blending function computation until the system is restarted.

Further details related to the monitoring system and techniques of the invention are described hereafter.

In the following description, various embodiments of the present invention may be described herein in terms of various architecture elements and processing steps. It should be appreciated that such elements may be realized by any number of hardware or structural components configured to perform specified operations. For purposes of illustration only, exemplary embodiments of the present invention will frequently be described herein in connection with aircraft avionics. The invention is not so limited, however, and the concepts and devices disclosed herein may be used in any control environment. Further, it should be noted that although various components may be coupled or connected to other components within exemplary system architectures, such connections and couplings can be realized by direct connection between components, or by connection through other components and devices located therebetween. The following detailed description is, therefore, not to be taken in a limiting sense.

According to various exemplary embodiments of the invention, a control system architecture suitably includes sufficient computation redundancy and control command management to either isolate or recover a faulted processor, or to recover all processing units of the redundant system without adverse effects. Computational redundancy may be provided with multiple processors or processing units within a computer or computing platform. In addition to isolating and recovering from internal faults, various embodiments allow processing units to detect faults in other system elements such as sensors, adaptors, actuators and/or effectors. Further embodiments may also include one or more actuator adaptor units, that through the detection of adverse data errors, detect faults in other system components (that are in addition to the processing units) and issue discrete instructions to trigger a recovery.

An exemplary control system architecture suitably includes multiple processors, each of which is configured for rapid recovery from various faults. The term "rapid recovery" indicates that recovery may occur in a very short amount of time. To maintain the operation of a control system, it is generally desirable that a recovery from a soft fault takes place within about 1 to 2 computing frames. As used herein, a "computing frame" is the time needed for a particular processing unit to perform a repetitive task of a computation, e.g., the tasks that need to be calculated continuously to maintain the operation of the controlled plant. In some embodiments, processor recovery is performed within about 1 computing frame and redundancy recovery is performed within about 1 or 2 computing frames, or otherwise in a short enough time period so as to have only minimal effects, if any, on system performance.

The ability of a processor to initiate recovery from a soft fault allows various embodiments of the present invention to aid in the recovery of the system as a whole. In addition, soft faults may be detected in the same computing frame or within several frames in which the faults occur. In embodiments where faults are detected within a single computing frame each processor need only store control and logic state variable data for the immediately preceding frame for use in recovery purposes, which may take place essentially instantaneously. Accordingly, the dependence of each component upon other redundant components is suitably reduced.

Instructions for carrying out the various methods, process tasks, calculations, control functions, and the generation of signals and other data used in the operation of the system of the invention are implemented, in some embodiments, in software programs, firmware, or computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

By way of example, and not limitation, such computer readable media can include floppy disks, hard disks, ROM, flash memory ROM, nonvolatile ROM, EEPROM, RAM, CD-ROM, DVD-ROM, or other optical disk storage, magnetic disk storage, or other magnetic storage devices, or any other medium that can be used to carry or store desired program code means in the form of computer executable instructions or data structures. When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media. Computer executable instructions comprise, for example, instructions and data which cause a general purpose computer, special purpose computer, or special purpose processing device to perform a certain function or group of functions.

The system of the invention will also be described in the general context of computer readable instructions, such as program modules, being executed by a processor. Generally, program modules include routines, programs, objects, data components, data structures, algorithms, etc. that perform particular tasks or implement particular abstract data types. Computer executable instructions, associated data structures, and program modules represent examples of a program code means for executing steps of the methods disclosed herein. The particular sequence of such executable instructions or associated data structures represents examples of corresponding acts for implementing the functions described in such steps.

Referring now to FIG. 1, an exemplary scaleable architecture of a digital control system 100 that can employ the monitoring system and method of the invention includes a first computing unit 112 and a second computing unit 114. The computing units 112 and 114 can be any digital control device such as a digital computer or processor, and provide for redundancy in processing. Each computing unit 112, 114 suitably includes one or more processing devices capable of executing multiple and/or simultaneous software processes. As shown, the computing units 112 and 114 can include real-time multi-tasking computing platforms such as a primary flight control computer (PFCC). The PFCC can be an integrated modular computing platform (IMCP) with dual computational lanes.

The computing units 112 and 114 provide input processing, sensor selection, control laws (e.g., pitch, yaw, and roll inner loops), monitoring (e.g., actuator and surface position monitoring), equalization, rapid recovery, redundancy management, and any appropriate recovery triggers. Although control system 100 is shown with two computing units, additional computing units can be employed if desired.

Each of the computing units 112 and 114 are in operative communication with a multitude of actuator control units (ACUs) 116, 118, 120, and 122, which provide for actuator command (Cmd) management and have dual computing lanes. The ACUs perform command blending and selection, and use other redundant actuator command values while a computing platform such as a PFCC lane is recovering. The ACUs also perform monitoring of actuator command lanes, data concentration, and initiation of a selective and isolated recovery trigger of each monitored application. The ACUs can also be redundant per control axis. Although control system 100 is shown with four ACUs, a varying number of ACUs can be employed depending upon system requirements. For example, in some embodiments three or more ACUs can be employed in a control system according to the invention.

Each ACU 116, 118, 120, and 122 can be in operative communication with a respective one of a smart actuator 124, 126, 128, and 130. An actuator is made "smart" when an electronics module such as an electronic interface unit (EIU) is added to the basic actuator. The smart actuators used in the control system can be dual-channel, fail-passive, electromechanical actuators, which contain two independent computational lanes. The smart actuators receive actuator position command signals from the ACUs. The smart actuators also determine validity of commands from the computing unit based on command validity flags and activity monitoring. The smart actuators 124, 126, 128, and 130 are configured to provide feedback to the respective ACU 116, 118, 120, and 122 related to actuator position information.

The smart actuators 124, 126, 128, and 130 can optionally be in operative communication with a respective servo or actuator device such as hydraulic actuators 132, 134, 136, and 138. The hydraulic actuators 132, 134, 136, and 138 can be respectively coupled to various control effectors 140, 141, 142, and 143 such as, for example, various primary flight control surfaces of an aircraft (e.g., rudders, ailerons, and/or elevators). The control effectors 140-143 are configured to provide feedback to the respective ACU 116, 118, 120, and 122 related to surface position information.

As depicted in FIG. 1, the computing units 112 and 114 receive data inputs from sensor sets 150, 152, and 154, which can include air data, inertial data, or commands from an operator (e.g., pilot controls, etc.). The sensor sets can include any number of gyroscopes, vehicle position sensors, airflow sensors, temperature sensors, and/or other sensing devices as may be appropriate for the particular implementation. A data concentrator 156, 158, and 160 with a single lane can be implemented between each sensor set 150, 152, 154 and computing units 112 and 114. The data concentrators suitably receive and concentrate data from the sensors to provide an interface to computing units 112 and 114 as appropriate. The data concentrators may also provide sensor validity monitoring to ensure that the sensors remain active. Each of the sensors may optionally include rapid recovery elements if available and desired for the particular implementation.

The control system 100 can be suitably implemented, for example, as part of a digital flight control system to provide functions for the safe flight and landing of aerospace vehicles. The control system 100 provides for independent recovery of any computing lane, and all system elements can be executed asynchronously. Also, control system 100 can accommodate the asynchronous operation of dissimilar computational redundancy. For example, the PFCC performs equalization of surface positions by bringing diverging data back to the same value or close to the same value. An actuator command management voting algorithm accommodates asynchronous surface command inputs such that the PFCC, ACU, and other elements can execute asynchronously, and can accommodate computational lanes using dissimilar computational redundancy.

The computing platform such as the PFCC provides a real-time multi-tasking computer system with rollback recovery capability. The PFCC enables integration of functions, and applications may selectively use the recovery function as required. The recovery mechanism operation can be verifiable using common built-in-test methods, which can be used to verify operation of the recovery mechanism at any time. The PFCC can also provide monitoring of ACU surface commands and surface positions.

During operation of control system 100, computing units 112, 114 receive input from sensor sets 150, 152, 154 via data concentrators 156, 158, 160. Each computing unit provides the appropriate data to each computational lane thereof, which operate as separate partitioned processing units. Accordingly, each data set from redundant sensor and command data sets can be simultaneously processed in multiple isolated processing units. The commands signals from each lane of computing units 112, 114 propagate to each of the ACUs 116, 118, 120, and 122. The ACUs transmit the command signals to the smart actuators 124, 126, 128, and 130, which then perform the requested commands as appropriate to control the hydraulic actuators 132, 134, 136, 138, and thereby the control effectors 140-143. During normal operation, the output signals from each processing unit can be monitored internally, or externally by the ACUs, to ensure that each of the computing units 112, 114 are producing results within a predetermined tolerance of the remaining computing units.

Each processing unit of computing units 112, 114 is configured to be capable of rapid recovery from soft faults. To accomplish rapid recovery, each processing unit is configured to retrieve control and logic state variable data from internal memory locations such as a high integrity random access memory. Using the retrieved state variables and appropriate sensor data, each processing unit can fully recover from a soft fault relatively quickly without requiring a data transfusion from another computing unit. The rapid recovery cycle involves halting processor execution, instating state variables from a protected memory area, and starting execution again at an appropriate location in the program execution cycle. Through the use of command blending, equalization, or other techniques, it is not necessary to synchronize with the remaining processing units when initiating the rapid recovery cycle.

A suitable fault recovery system that can be used in the control system of the present invention is disclosed in copending U.S. patent application Ser. No. 11/058,764 filed on Feb. 16, 2005, which is incorporated herein by reference.

During a rapid recovery cycle, the tolerance used in an ACU to determine if a processing unit is operating properly may be relaxed for that particular processing unit. For example, during normal operation, there may be a predetermined tolerance, within which each of the processing units is expected to operate. If a processing unit produces values that are not within the predetermined tolerance, that processing unit may be determined to be suffering from a soft fault, and a rapid recovery cycle may be initiated. During the rapid recovery cycle, the predetermined tolerance for the affected processing unit may be initially widened and then narrowed over a predetermined time period such that further deviations are acceptable until the processing unit resumes normal operation.

Furthermore, the output of the processing unit may not be included in the derivation of the output from the ACU (e.g., computation of the mid-value) until the output comes within the relaxed tolerance. If the output comes within tolerance (indicating that the computing unit has stabilized) within a predetermined period of time, it may once again be included in the output derivation. Before the predetermined time has expired and the processing unit output has come within tolerance, requests for placing the processing unit into a rapid recovery state may be suspended or "masked" to allow the processing unit to recover. Once the processing unit has stabilized from the recovery cycle, it may be subjected to the previous tolerances. If the output does not come within tolerance within the predetermined time, another request to place the processing unit into a rapid recovery state may be issued.

In general, if the output of a recovered element falls outside of the relaxed tolerance following recovery, that computational element is kept off-line until the system is restarted (i.e., re-powered). Such a failure indicates that the recovery was unsuccessful. While rare, this provides a means for excluding a computational element that does not return to the tolerance within a specified time period. The tolerance used following recovery is tightened over a specific time period until it reaches the original tolerance.

One technique for computing the blended control output involves computing a "mid-value" in which the signals from a processing unit are used to compute a mean and/or median of all of the values produced. This mid-valve is then compared to each signal from each of the processing units in the system. If a discrepancy exists between any particular value produced by any lane and the mean and/or median of all the values (i.e., the mid-values), an error condition is detected to exist the appropriate processing unit initiates a rapid recovery cycle. The discrepancy from the mid-values may be based upon any tolerance value, which can in turn be adjusted based upon desired conditions. The detection of discrepancy from a mean or median value can be processed very rapidly, thus potentially resulting in an identification of an error within one or two computational frames of the value being produced. Accordingly, differences from mid-values may be computed based upon previous mid-values (i.e., values maintained from a previous frame), or can be computed in real time as appropriate.

Alternatively, when one or more of the ACUs 116, 118, 120, 122 sense that one of the computing units 112, 114 are not supplying signals that lie within certain tolerances, the ACUs may transmit a signal to the computing unit in question to request the start of a rapid recovery cycle for a particular processing unit. The computing units of the control system are configured to perform redundancy management actions such as equalization, in which the control signal generated by each processing unit is driven toward fine adjustments in the computed mid-value, so that the signals produced by each processing unit result in an equalized control command. Such implementations typically do not require tight synchronization between the various processing units to achieve "equalized" command values because each command signal is driven toward the other signals (i.e., toward a mid-value).

An equalization signal is derived from feedback of control effector positions and is used to cancel out drift in the surface commands, preventing divergence of computed surface commands. This allows tight monitoring and comparison of the command signals in the ACU and the rapid detection of computing element errors in time to command recovery before state variable values are permanently lost.

Use of the equalization method allows asynchronism of the control computation elements so that the implementation of the elements may be either similar or dissimilar as called for in order to meet reliability and availability requirements. For example, different types of processors may be employed in the computing units if desired. The equalization scheme also accommodates errant surface positions By implementing mid-value signal selection and equalization, rapid recovery of redundant elements is provided for in a transparent, seamless way. That is, any data errors in any processing unit do not propagate through the system to adversely affect the control function. If one processing unit encounters a soft fault and proceeds to a recovery cycle, the remaining operating processing units are unaffected by the recovery cycle and the operation of the control system as a whole is unaffected. Because the error is very quickly confined, recovery of redundant control commands can be processed very rapidly.

As discussed previously, the monitoring system of the invention generally comprises two independent monitoring planes within a control system. The first monitoring plane is internal to the computing units in the control system. For example, the first monitoring plane can be implemented in computing units 112, 114 of control system 100. The second monitoring plane is external to the computing units in the control system, and can be implemented in the ACUs of control system 100.

The internal first monitoring plane includes two in-line monitors. The first internal monitor is a self-checking, lock-step-processing platform with integrated rapid recovery capability. The first monitor triggers a recovery mechanism on a lane miscompare or a lockstep fault, and may be readily integrated with existing state of the art monitoring methods implemented in either hardware or software (e.g., error detection and correction (EDC) codes, parity, and others).

The second internal monitor of the first monitoring plane includes reasonableness monitors, which compare actual surface positions with commanded surface positions. Such monitors can include time magnitude monitoring; servo monitoring in which a servo monitor compares effector commands with effector positions and isolates faults to actuator/servo devices; and ACU monitoring, in which an ACU monitor compares effector command computations by a computer with ACU blended effector commands, and isolates faults to an ACU. A built-in test of recovery mechanism can also be provided, in which a simulated soft fault triggers a recovery mechanism, followed by the test recovery memory contents being compared to known test values. This verifies that the recovery mechanism is fully operational.

Figure 2:
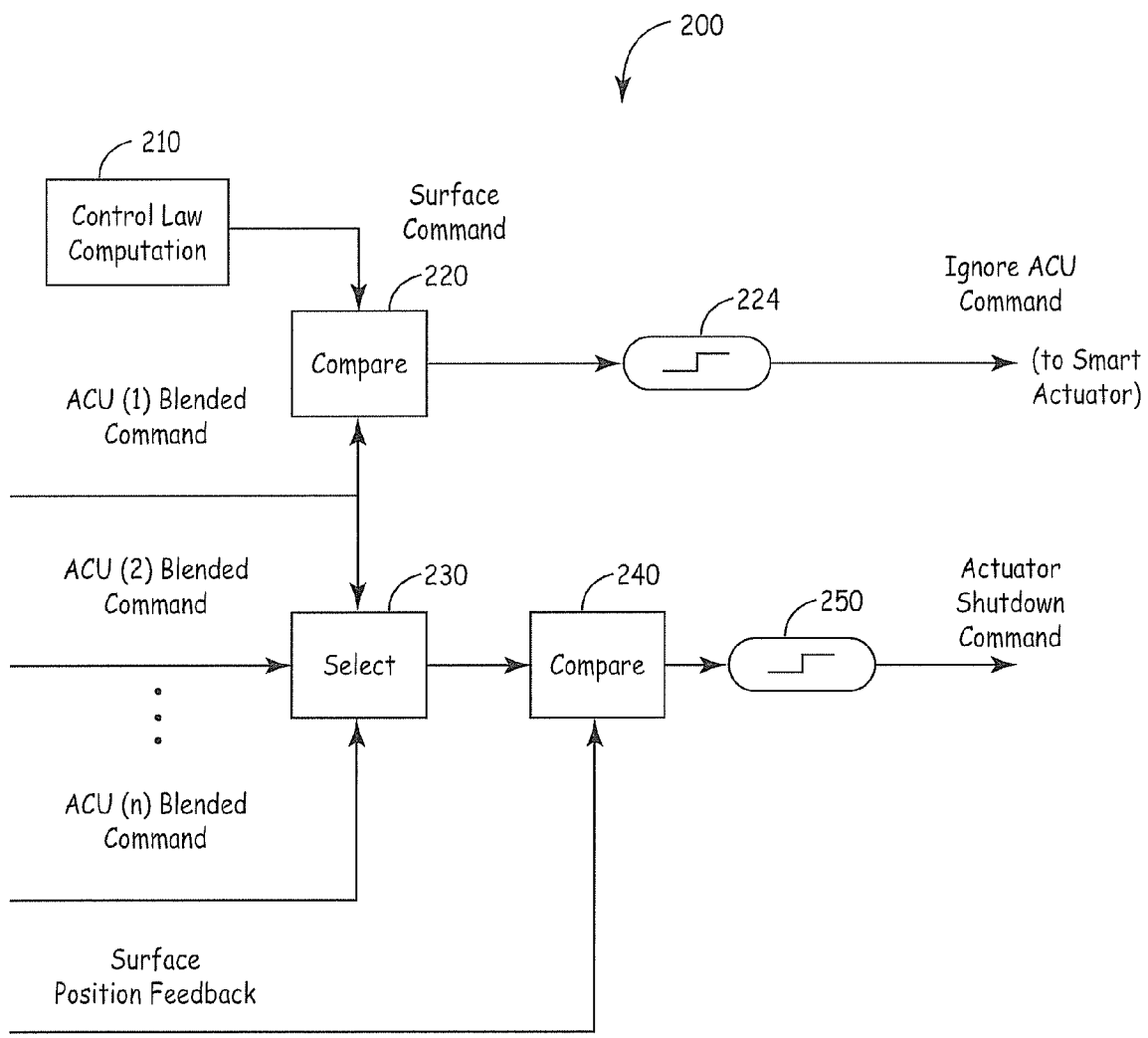
FIG. 2 is a schematic depiction of a time magnitude monitor that can be used in a digital control system.

FIG. 2 is a block diagram of an exemplary time magnitude monitor 200 that can be used in a reasonableness monitor. During operation of monitor 200, a processing unit of the control system performs a control law computation 210 and sends a computed surface command to a compare module 220 for comparison with an ACU(1) blended command. A smart actuator is commanded to ignore the ACU(1) blended command when deviations between the ACU(1) blended command output and the computed surface command are beyond an established limit for a specified time 224. The ACU blended actuator commands for ACU(1), ACU(2) . . . ACU(n) are sent to a select module 230, and the selected command is sent to a compare module 240 for comparison with a surface position feedback signal. When deviations between the selected command output and the surface position feedback signal exceed an established limit for a specified time 250, the actuator is commanded to shutdown.

Figure 4:
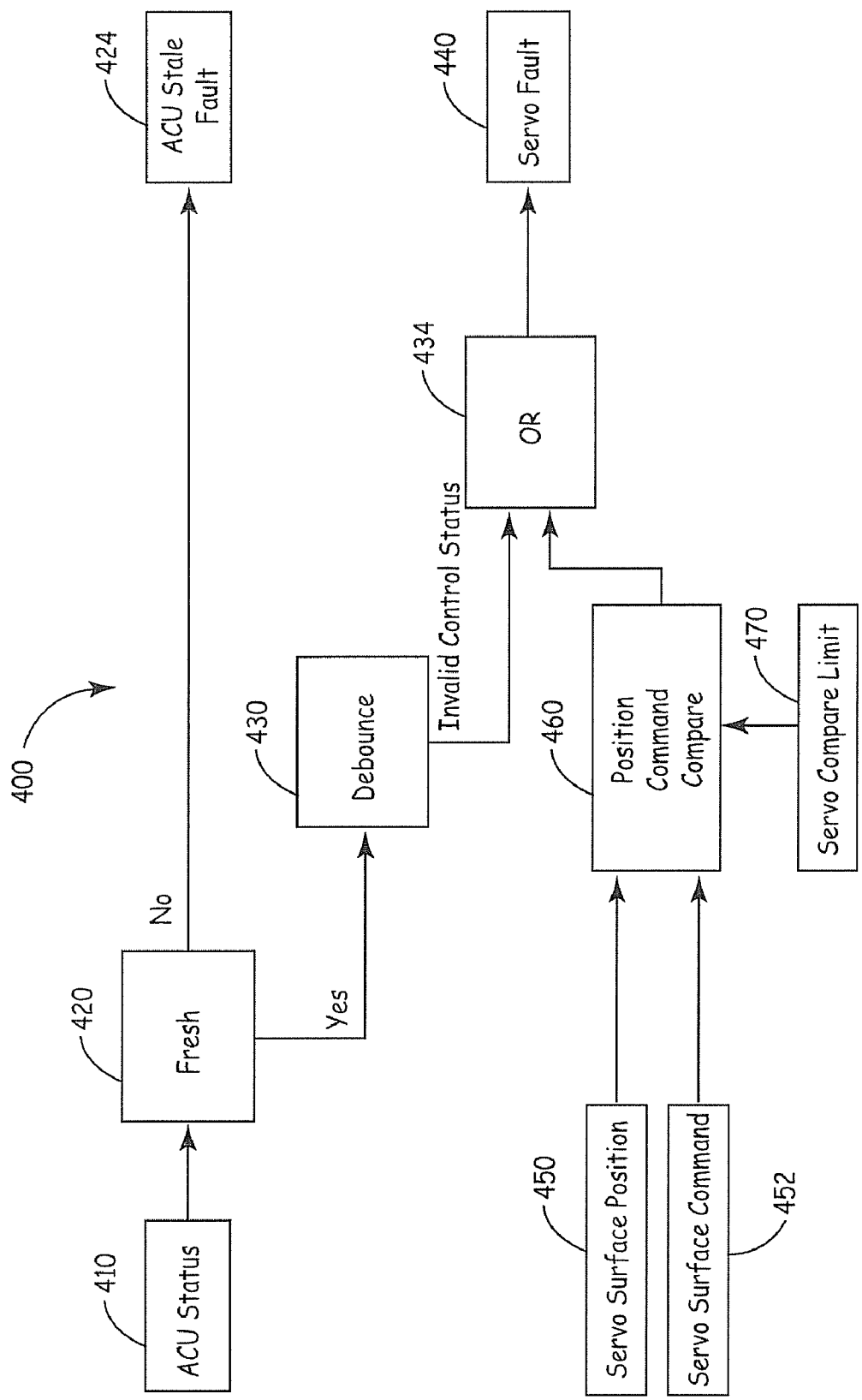
FIG. 4 is a block diagram of a servo monitor that can be used in a digital control system.

FIG. 4 depicts an exemplary servo monitor 400 that can be used in a reasonableness monitor to isolate faults to either a servo/actuator or an ACU. This monitor is not limited to monitoring ACUs or surface servos/actuators, but can apply to a variety of control system implementations. During operation of monitor 400, each computing unit such as an FCC monitors each servo input for each control axis. In a first monitoring lane, an ACU status value 410 is sent to a fresh test module 420 to determine its freshness. If the ACU status value is not fresh, it is flagged as an ACU stale fault 424 and is excluded from further monitoring. A fresh ACU status value is sent to a debounce module 430 for validation. An invalid control status value is sent to an OR logic module 434, resulting in a servo fault 440 being reported. In a second monitoring lane, a servo surface position 450 and a servo surface command 452 are sent to a position/command compare module 460 for comparison. If the servo surface position 450 and servo surface command 452 have a difference that exceeds a predetermined servo compare limit 470, a signal is sent to OR logic module 434, resulting in a servo fault 440 being reported.

Figure 5:
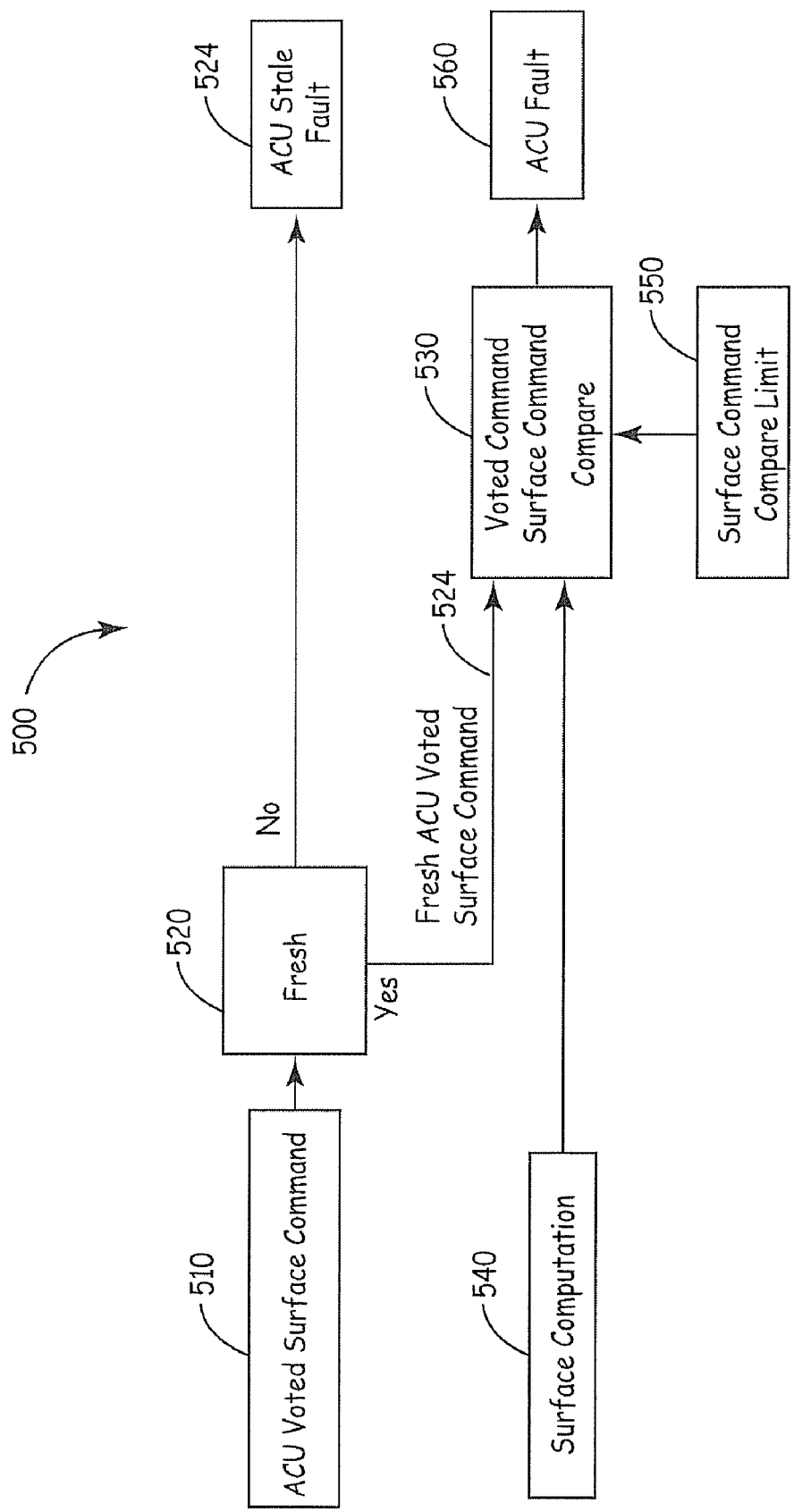
FIG. 5 is a block diagram of an actuator control unit monitor that can be used in a digital control system.

FIG. 5 illustrates an exemplary ACU monitor 500 that can be used in a reasonableness monitor. The monitor 500 performs monitoring of computing elements in a pre-recovery trigger mode, with variable tolerance not being applied at this point. During operation of monitor 500, each ACU input in each control axis is monitored by each computing unit such as an FCC. An ACU voted surface command 510 is sent to a fresh test module 520 to determine its freshness. If the ACU voted surface command is not fresh, it is flagged as ail ACU stale fault 524 and is excluded from further monitoring. A fresh ACU voted surface command 524 is sent to a voted command/surface command compare module 530 for comparison with a surface computation 540. If the difference between ACU voted surface command 524 and surface computation 540 exceeds a predetermined surface command compare limit 550, an ACU fault 560 is asserted.

As discussed previously, the external second monitoring plane includes two monitors on ACUs. The first external monitor includes a pre-recovery computing monitor, and the second external monitor includes a post recovery computing monitor.

In the pre-recovery computing monitor, multiple command computations are independently monitored across multiple redundant computing units. Fresh and valid commands are combined to form a blended command. Each input is compared with the blended command and a rapid recovery of errant computational elements is triggered within a computing unit when the difference between the blended command and a command computation is outside a predetermined monitor window limit. A computational element that is commanded to recover is excluded from pre-recovery monitoring until it is restored.

Figure 3:
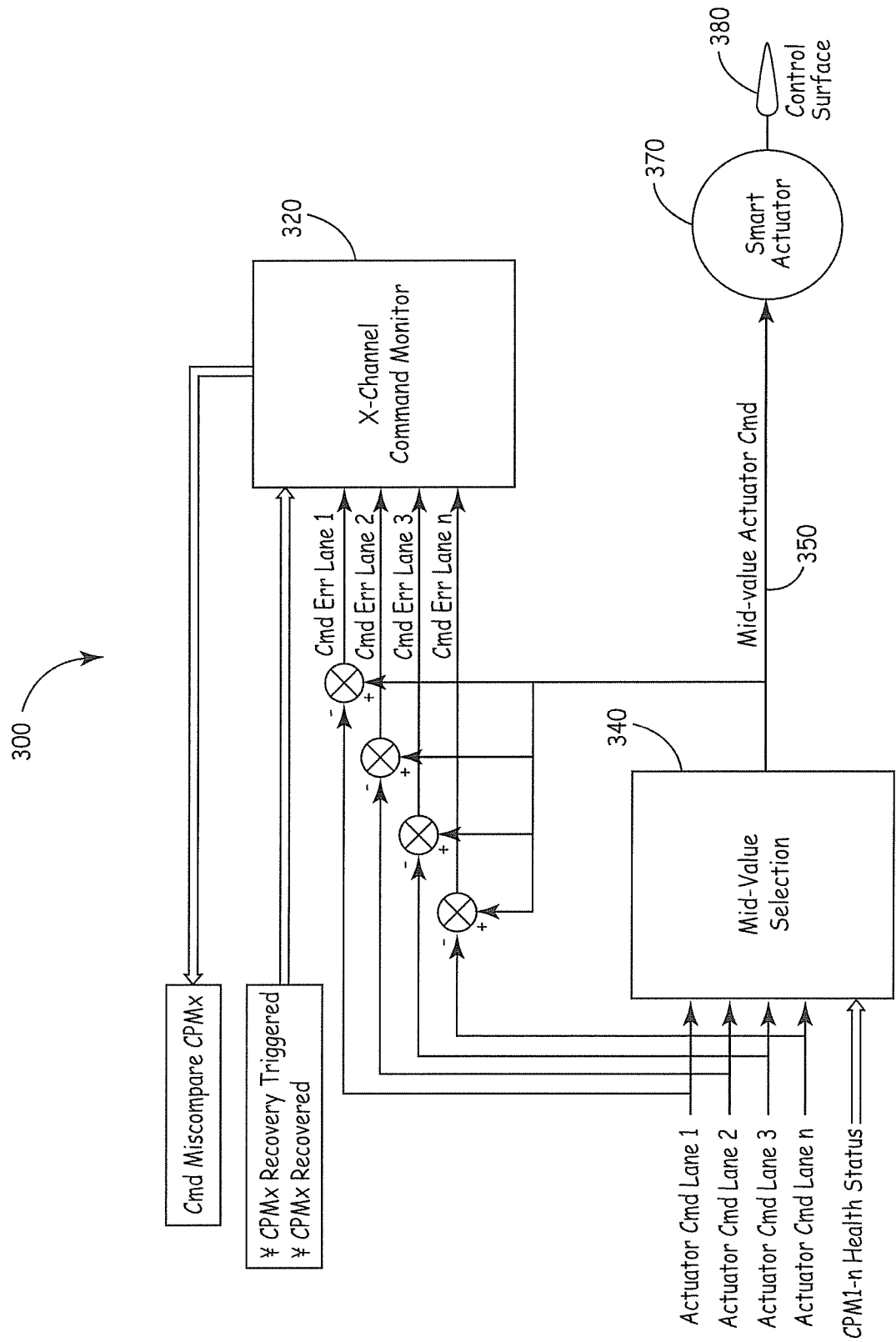
FIG. 3 is a block diagram of an exemplary actuator command selection and lane command monitor employing rapidly recoverable computing elements.

FIG. 3 shows an exemplary actuator command selection and x-lane command monitor 300 that can be used in the pre-recovery computing monitor. The monitor 300 includes a command error monitor 320 and a mid-value selection module 340. During operation of monitor 300, actuator command values are received by mid-value selection module 340 from actuator command lanes 1, 2, 3, . . . n, which also send the command values to command error lanes 1, 2, 3, . . . n that communicate with command monitor 320. The mid-value selection module 340 includes temporary or permanent deselection of an actuator command lane based on CPM recovery (health) status/history. A selected mid-value actuator command 350 is sent to a smart actuator 370 that operatively communicates with a control surface 380. The selected mid-value command 350 is also sent to command error lanes 1, 2, 3 . . . n for command monitoring by monitor 320. The command error monitor 320 is initially widened for a specific CPM following a recovery trigger and narrows over a specific time window until the tolerance reaches the pre-recovery value. The command monitor also flags a command miscompare to a CPM when an error is detected. The logic of monitor 300 can be replicated for each control surface.

Figure 6:
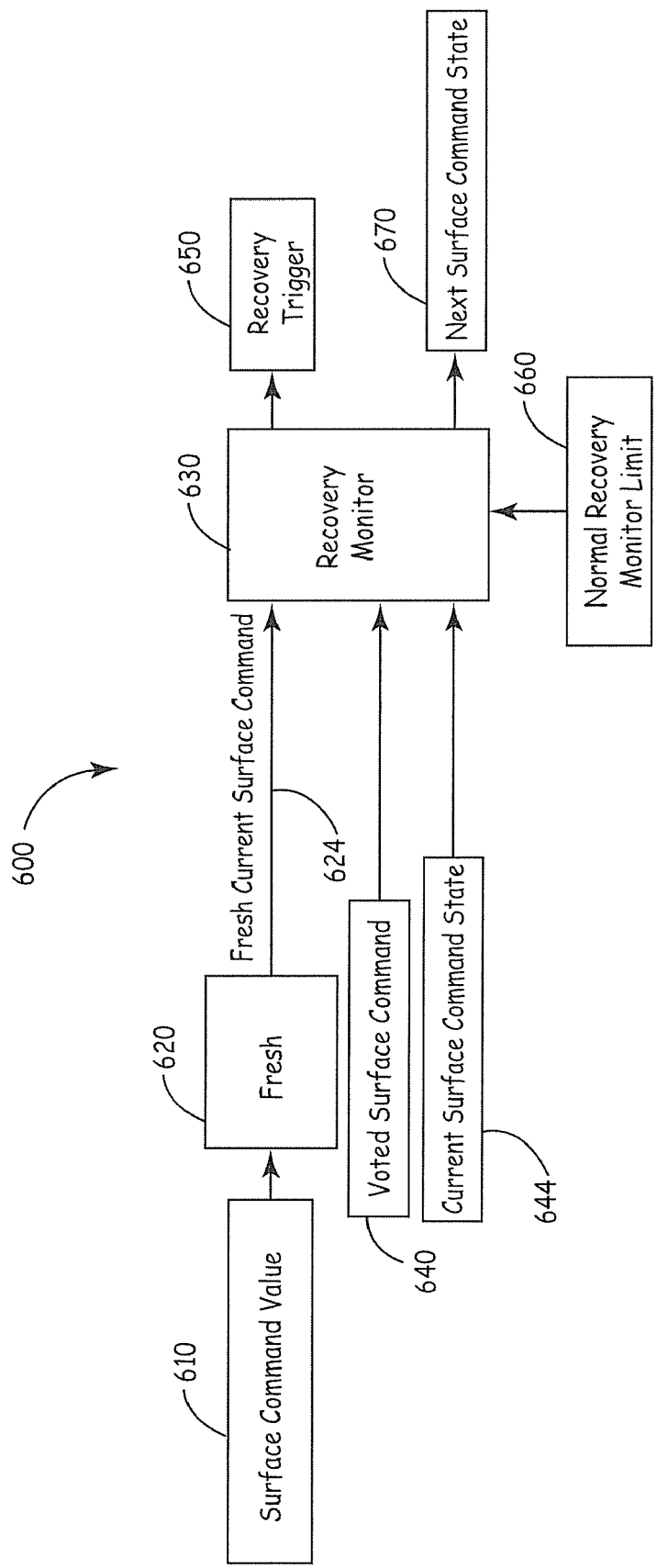
FIG. 6 is a block diagram of an actuator control unit computing monitor that can be used in a digital control system.

FIG. 6 depicts an exemplary ACU pre-recovery monitor 600 that can be used in the pre-recovery computing monitor. During operation, a surface command value 610 is sent to a fresh test module 620 to determine its freshness. A fresh current surface command 624 is sent to a recovery monitor 630 and compared with an ACU voted surface command 640 and a current surface command state 644. A recovery trigger 650 is generated if the difference between current surface command 624, voted surface command 640, and current surface command state 644 exceeds a normal recovery monitor limit 660. Thereafter, a next surface command state 670 is set to recovery. The computer elements that are commanded to recover are excluded from recovery monitoring until restored. When the difference between a current surface command 624, a voted surface command 640, and current surface command state 644 remains within the normal recovery monitor limit 660, a next surface command state 670 remains in a normal state and no recovery trigger is generated.

The post recovery computing monitor in the second external monitoring platform monitors the integrity of a previously recovered computational element that has been gracefully restored within a redundant control unit. After recovery, the recovered computational element is monitored using a variable time magnitude monitor, in which a recovery monitor window is extended or widened for recovering computer surface command inputs following an external recovery trigger. The recovery monitor window narrows with time until it reaches the initial surface command monitor window limit. This allows a recovered computational element to gracefully return to a viable state (fresh and reasonable) in a mid-value computation. An input value from the recovered computational element is restored to a viable state and included in the mid-value vote if the difference between the input value and the mid-value remains within the widened monitoring window for the allocated recovery time. If the input value from the recovered computational element falls outside the widened monitor window, the input value is discarded until a system restart or power cycle.

Figure 7:
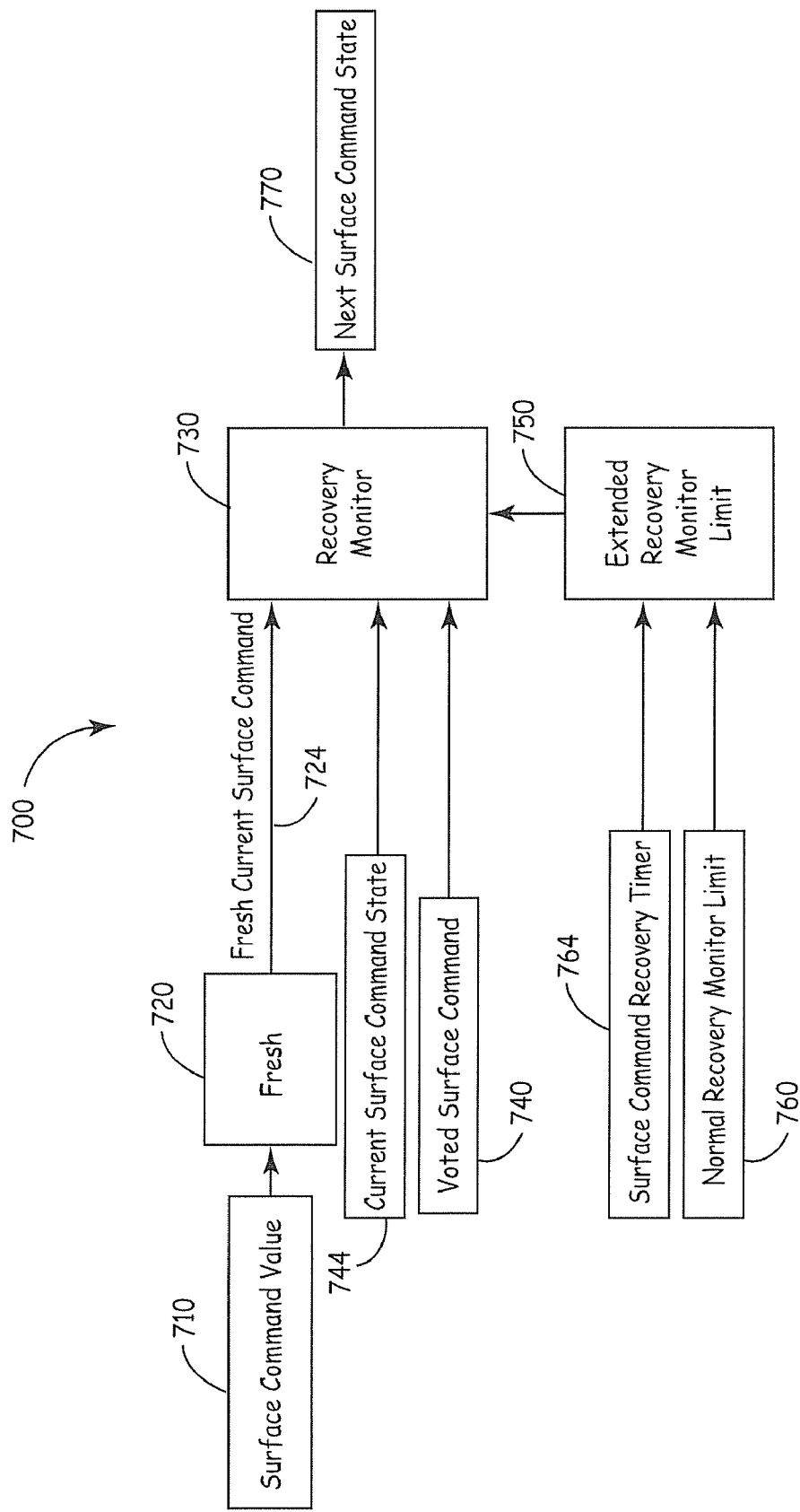
FIG. 7 is a block diagram of a post recovery computing monitor that can be used in a digital control system.

For example, FIG. 7 illustrates a post recovery computing monitor 700. During operation, each ACU monitors each computer surface command value in an ACU axis. A surface command value 710 is sent to a fresh test module 720 to determine its freshness. A fresh current surface command 724 is sent to a recovery monitor 730 and compared with an ACU voted surface command 740 and a current surface command state 744. The surface command values in the recover state, as indicated by current surface command state 744 are monitored by recovery monitor 730. An extended recovery monitor limit 750 is determined by adding an offset to the normal recovery monitor limit 760, and the offset is reduced as a surface command recovery timer 764 expires. A next surface command state 770 remains in a recover state while the difference between current surface command 724 and voted surface command 740 does not exceed the extended recovery monitor limit 750 and surface command recovery timer 764 has not expired. The next surface command state 770 is disabled if the difference between current surface command 724 and voted surface command 740 exceeds the extended recovery monitor limit 750. The next surface command state 770 is set to normal if the difference between current surface command 724 and voted surface command 740 remains less than the extended recovery monitor limit 750 for the duration of the surface command recovery timer 764. This allows current surface command value 724 to be reintroduced into the voted surface command computation.

The post recovery computer monitor can be invoked in an ACU to monitor a PFCC following a recovery of a PFCC triggered by the ACU. The PFCC outputs may be included in the ACU servo command computation if the outputs of the previously recovered PFCC fall within an acceptable range when compared to the voted or averaged value of the healthy PFCCs within the system. The recovered PFCC may be disabled for the duration of the mission if the post recovery commands do not fall within the acceptable range within a specified time period. The ACU either puts the recovered PFCC back into use after a recovery is triggered or excludes computations from the PFCC until the next system restart.

In general, the monitoring techniques of the invention are scalable, as there is no dependency on sorting, voting, or monitoring algorithms that would exclude a greater number of computational elements from being monitored. The monitoring techniques are also asynchronous and independent of surface command computations within a control system such as a primary flight control system. The monitoring techniques are also independent of servo and actuator redundancy management. Thus, the actuator controller is not required to be controlling the actuator for the monitoring methods to be active and functional.

The blended surface command computation, monitoring, and output to a servo/actuator occur in a single computational frame. Thus, prior inputs are not required. In addition, the recovery of a computational element is selective depending upon which computation is in error. The time magnitude monitoring method can be used to gracefully restore a previously recovered computational element to the original system configuration. The monitoring methods aid in computational element fault isolation to both the actuator control unit and a servo/actuator system driven by the actuator control unit.

When used in a flight control system, the present monitoring methods ensure that the pilot is always connected to control surfaces through a computer, and therefore no backup direct connection is required to ensure safe flight and landing of the aircraft. The monitoring methods allow multiple asynchronous command channels to control and monitor each individual aircraft surface.

The present monitoring methods detect a single errant computation and trigger a computer recovery within a single computational frame. The monitoring methods also monitor the recovery process and will restore a redundant element if the errant element successfully recovers. The monitoring techniques work in the presence of soft faults in the control system architectural elements and improve the mean time between unscheduled removals (MTBUR), moving it toward the mean time between failure (MTBF).

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A monitoring system for a recoverable digital control system, the monitoring system comprising:
    a first monitoring plane internal to one or more computing units in the control system, the first monitoring plane comprising:
        a first internal monitor comprising a self-checking, lock-step-processing monitor with integrated rapid recovery capability; and
        a second internal monitor comprising one or more reasonableness monitors that compare an actual effector position with a commanded effector position; and
    a second monitoring plane external to the computing units, the second monitoring plane comprising:

a first external monitor comprising a pre-recovery computing monitor; and a second external monitor comprising a post recovery computing monitor;

wherein the first external monitor is configured to independently monitor multiple effector position command computations across the computing units;

wherein the first external monitor is configured to sort fresh and valid input commands from the computing units by magnitude, and compute a blended command by averaging two sorted input commands closest to a median of all the input commands while discarding outlying input commands from the blended command computation; and wherein the computing units provide a real-time integrated modular computing platform.

2. The monitoring system of claim 1, wherein the one or more reasonableness monitors comprise a time magnitude monitor that is configured to compare a blended command with a computed command.

3. The monitoring system of claim 1, wherein the one or more reasonableness monitors comprise a servo monitor that is configured to compare effector commands with effector positions, and isolate any fault to a servo or an actuator control unit.

4. The monitoring system of claim 3, wherein the fault comprises a soft fault.

5. The monitoring system of claim 1, wherein the one or more reasonableness monitors comprise an actuator control unit monitor that is configured to compare command computations of a computing unit with actuator control unit commands, and isolate any fault to an actuator control unit.

6. The monitoring system of claim 5, wherein the fault comprises a soft fault.

7. The monitoring system of claim 1, wherein the first external monitor is configured to compare each input command with the blended command and trigger a rapid recovery of an errant computational element within a computing unit when the difference between the input command and the blended command is outside of a predetermined monitor window limit.

8. The monitoring system of claim 1, wherein the second external monitor is configured to monitor the integrity of a previously recovered computational element.

9. The monitoring system of claim 8, wherein the second external monitor is configured for monitoring a recovered computational element using a variable time magnitude monitor and an extended monitor window limit, wherein the extended monitor window limit narrows with time.

10. The monitoring system of claim 9, wherein the second external monitor is configured to allow the recovered computational element to return to a viable state in a blended command computation if a difference between an input command from the recovered computational element and a blended command remains within the extended monitor window limit for an allocated recovery time.

11. The monitoring system of claim 9, wherein the second external monitor is configured to discard any input command from the recovered computational element that falls outside the extended monitor window limit until a system restart or power cycle.

12. The monitoring system of claim 1, wherein the second monitoring plane is implemented in one or more actuator control units.

13. The monitoring system of claim 12, wherein the one or more actuator control units are in operative communication with one or more smart actuators.

14. The monitoring system of claim 13, wherein the one or more smart actuators are in operative communication with one or more actuator or servo devices.

15. The monitoring system of claim 14, wherein the actuator or servo devices are each operatively connected to one or more control effectors.

16. A method for independently monitoring multiple command computations across multiple redundant computing units, the method comprising:

sorting fresh and valid effector position commands from the computing units by magnitude;

computing a blended command by averaging two sorted input commands closest to a median of all the input commands;

discarding any outlying input commands from the blended command computation;

comparing each input command from a computational element of a computing unit with the blended command; and triggering a rapid recovery of any errant computational element when a difference between the blended command and an effector position command computation is outside a predetermined window limit.

17. The method of claim 16, further comprising:

monitoring integrity of a previously recovered computational element by a method comprising:

monitoring the recovered computational element using a variable time magnitude monitor in which an extended monitor window narrows with time;

allowing the recovered computational element to return to a viable state in a blended command computation if a difference between an input command from the computational element and a blended command remains within the extended monitor window for an allocated recovery time; and discarding an input command from the recovered computational element if the input command falls outside of the extended monitor window until a system restart or power cycle.

18. A method for time magnitude monitoring comprising:

comparing a blended command output with a computed effector command, wherein the blended command output is computed by averaging two sorted input commands closest to a median of all the input commands;

disregarding the blended command output when deviations between the blended command output and the computed effector command exceed an established limit for a specified time;

selecting a blended command output from a plurality of blended command outputs;

comparing the selected blended command output with an effector position feedback signal; and initiating an actuator shutdown command when deviations between the selected blended command output and the effector position feedback signal exceed an established limit for a specified time.

* * * * *